United States Patent [19]

Lapp

[11] 4,292,833
[45] Oct. 6, 1981

[54] CRIMPING TOOL

[76] Inventor: Ellsworth W. Lapp, c/o Lapp Engineering, Inc., 4701 Hydraulic Rd., Rockford, Ill. 61109

[21] Appl. No.: 51,101

[22] Filed: Jun. 22, 1979

[51] Int. Cl.³ .............................................. B21D 37/4
[52] U.S. Cl. ...................................... 72/416; 72/410; 72/453.16; 72/481; 81/423
[58] Field of Search ............ 72/410, 412, 416, 453.15, 72/453.16, 472, 409, 481; 81/180 B, 423, 421, 422

[56] References Cited

U.S. PATENT DOCUMENTS

| | | | |
|---|---|---|---|
| 2,869,407 | 1/1959 | Swanson | 72/409 |
| 3,057,233 | 10/1962 | Turner | 81/350 |
| 3,326,029 | 6/1967 | Porter | 72/410 |
| 3,808,870 | 5/1974 | Blancett | 81/423 |
| 4,109,845 | 8/1978 | Wedge | 81/423 |
| 4,192,171 | 3/1980 | Hamilton | 29/517 |

FOREIGN PATENT DOCUMENTS 1942413  4/1971  Fed. Rep. of Germany ........ 72/410

Primary Examiner—Gene P. Crosby
Attorney, Agent, or Firm—Leydig, Voit, Osann, Mayer & Holt

[57] ABSTRACT

A tool for radially crimping a piece of electrical conduit or the like with opposed crimping dies having concavely curved die cavities. Dies of one type are held releasably within die holders, one of which is movable toward the other. The tool also may be used with a different type of dies which are adapted to seat within the die cavities of the first dies. The first dies thus may be used selectively either as dies or as die adaptors.

4 Claims, 6 Drawing Figures

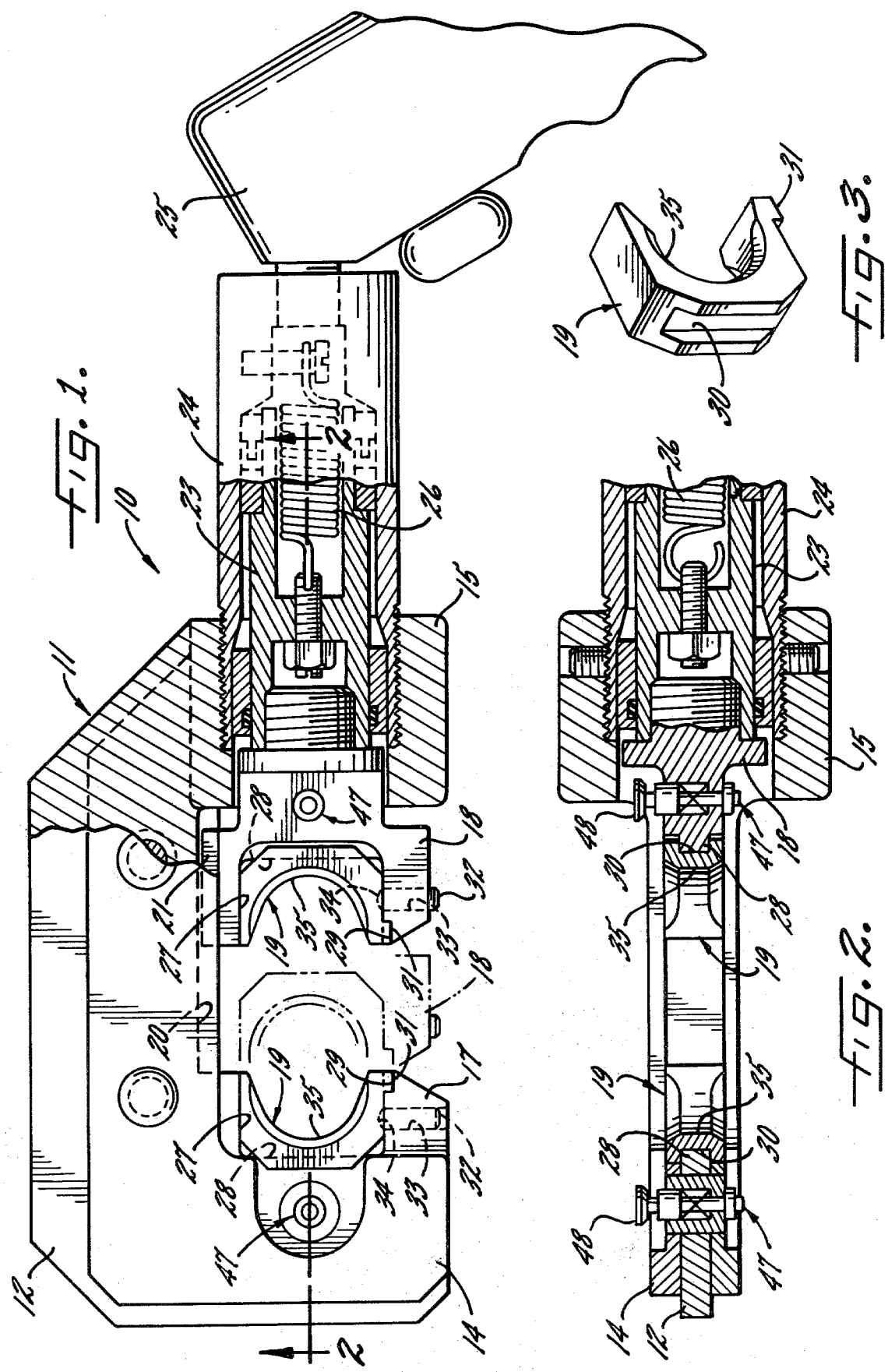

CRIMPING TOOL

BACKGROUND OF THE INVENTION

This invention relates to a tool for radially crimping a generally cylindrical workpiece such as a piece of electrical conduit. Such a tool usually comprises a head having a pair of opposed die holders which support crimping dies formed with concavely curved die cavities for crimping the workpiece. The crimping is effected by moving one of the die holders toward the other with a hydraulic actuator or the like in order to squeeze the workpiece between the die cavities of the crimping dies.

One known crimping tool is designed to use dies such as those made by Kearney National of Atlanta, Ga. The Kearney dies are generally block-shaped and fit snugly into generally rectangular pockets in the die holders. Set screws extend through the die holders and seat in sockets in the dies to hold the dies releasably in the holders.

Another type of crimping tool is adapted to use dies made by Burndy Corporation of Norwalk, Conn. Burndy dies also fit within pockets of die holders but each pocket is concavely curved in order to accommodate the convex curvature of the exterior of the die. Laterally spaced arms extend rearwardly from each of the Burndy dies and their free ends are formed with rearwardly opening notches. The notches of each set of arms receive a laterally extending locking pin which is supported slidably by the head in order to secure the die releasably in the die holder.

SUMMARY OF THE INVENTION

The general aim of the present is to provide a new and improved crimping tool which can be used with either of two different types of crimping dies so as to enable the tool manufacturer to supply a single model of tool to users having either type of dies.

A related object is to provide a crimping tool which is adapted to utilize either Kearney-type dies or Burndy-type dies.

A more detailed object is to achieve the foregoing by providing a crimping tool in which the pockets of the die holders are shaped to receive the Kearney-type dies and in which the Kearney dies themselves serve as holders and adaptors for the Burndy-type dies. The tool includes screws for securing the Kearney-type dies releasably in the pockets and includes locking pins for securing the Burndy-type dies releasably within the Kearney-type dies.

These and other objects and advantages of the invention will become more apparent from the following detailed description when taken in conjunction with the accompanying drawings.

BRIEF DESCRIPTION OF THE DRAWINGS

FIG. 1 is a fragmentary side elevational view of a new and improved crimping tool incorporating the unique features of the present invention, parts of the tool being broken away and shown in section. The tool is shown as being equipped with Kearney dies which are capable of performing a crimping operation.

FIG. 2 is a fragmentary cross-section taken substantially along the line 2—2 of FIG. 1.

FIG. 3 is a perspective view of a Kearney die.

DETAILED DESCRIPTION OF THE PREFERRED EMBODIMENT

Figure 4:
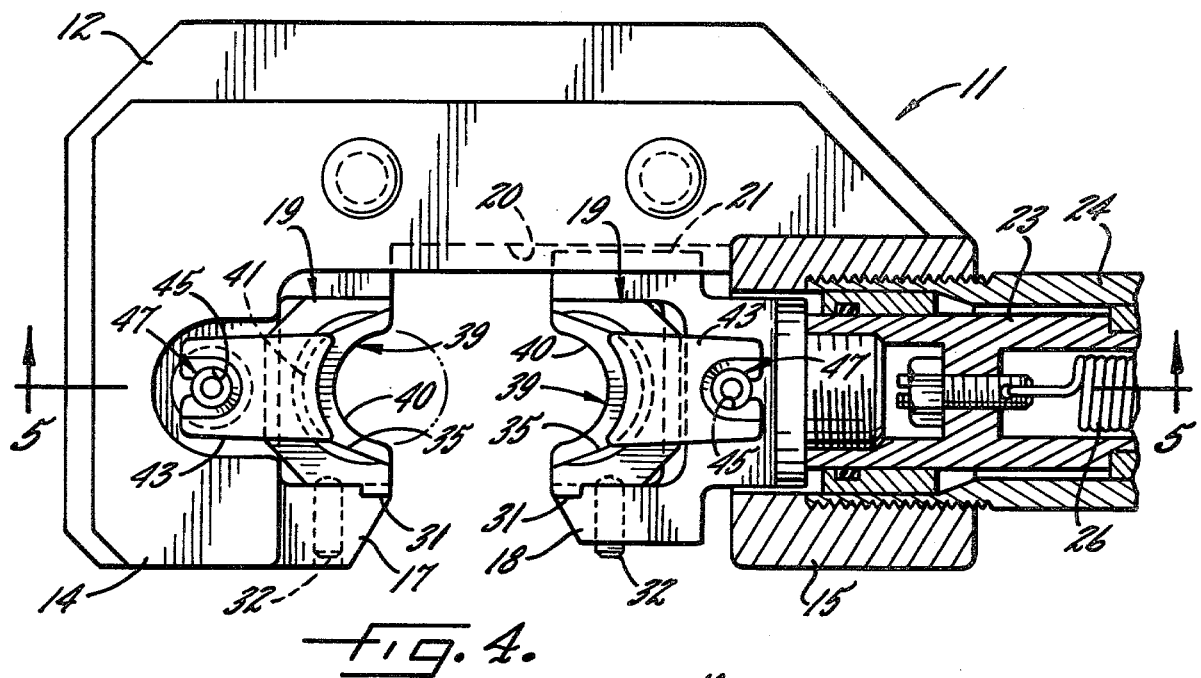
FIG. 4 is a fragmentary view similar to FIG. 1 but shows the tool equipped with Burndy dies for performing a crimping operation.

As shown in the drawings for purposes of illustration, the invention is embodied in a tool 10 for forming a circumferentially extending crimp in a generally cylindrical workpiece (not shown). The workpiece may, for example, be a piece of electrical conduit which is deformed in a radially inward direction when subjected to the action of the crimping tool.

In general, the crimping tool 10 comprises a head 11 of inverted U-shaped cross-section and formed with an upper crosspiece 12 and a pair of downwardly projecting legs 14 and 15. The head defines a downwardly opening throat 16 which is adapted to receive the workpiece.

The legs 14 and 15 support die holders 17 and 18, respectively, which are adapted to receive dies 19. The die holder 17 is fixed relative to the leg 14 while the die holder 18 is supported to move toward and away from the die holder 17. For this purpose, the crosspiece 12 of the head 11 is formed with a groove 20 (FIG. 1) which slidably receives a tongue 21 projecting upwardly from the die holder 18.

A piston 23 is secured to one end of the die holder 18 and is slidably received in a cylinder 24 which is attached to the leg 15 of the head 11. When pressure fluid is admitted into the cylinder by way of a handle 25 attached to the cylinder, the piston is moved from right to left to shift the die holder 18 towards the die holder 17 and cause the dies 19 to close upon and crimp the workpiece. When the pressure fluid is exhausted from the cylinder 24, the piston 23 and the die holder 18 are retracted by a contractile spring 26 which is connected between the piston and the cylinder.

Each of the die holders 17 and 18 is formed with a pocket 27 (FIG. 1) for receiving the respective die 19. As shown in FIG. 1, each pocket is generally U-shaped and includes parallel top and bottom walls which extend horizontally and a back wall which extends vertically. A tongue 28 is formed in the back wall of the pocket while a notch or groove 29 is formed in the bottom wall of the pocket.

The dies 19 are dies which are made by Kearney National of Atlanta, Ga. Each die is formed with a generally block-like exterior shape and includes parallel top and bottom walls and a vertical back wall adapted to seat against the top and bottom walls and the back wall, respectively, of the pocket 27. A groove 30 (FIG. 3) is formed in the back wall of each die and is adapted to receive the tongue 28 of the pocket 27. Similarly, a tongue 31 projects downwardly from the bottom wall of each die and is adapted to fit within the groove 29 in the bottom wall of the pocket. The various tongues and grooves coact to locate the die in the pocket. In addition, a dog-point set screw 32 (FIG. 1) is threaded into a tapped hole 33 formed through each die holder 17 and 18 and is received within a drill-point socket 34 formed in the bottom wall of the respective die 19. The set screws also serve to locate the dies in the pockets and further serve to secure the dies releasably to the die holders 17 and 18.

Each of the dies 19 is formed with a concavely curved die cavity 35 which is adapted to receive the workpiece. When the dies are closed, the die cavities place an appropriate crimp in the workpiece.

As described thus far, the crimping tool 10 is, for all practical purposes, similar to tools which are presently being used in conjunction with Kearney dies. Dies very similar to the Kearney dies also are made by ITT Blackburn of St. Louis, Miss. The ITT dies fit within the pockets 27 of the die holders 17 and 18 and can be used in the tool in place of the Kearney dies.

In accordance with the present invention, the crimping tool 10 is uniquely constructed so as to be able to also use dies 39 (FIGS. 4 to 6) which are substantially different from the dies 19. In carrying out the invention, the dies 39 are seated within the dies 19 and thus the latter dies serve as holders or adaptors for the dies 39.

More specifically, the dies 39 are of the type which are made by Burndy Corporation of Norwalk, Conn. Each Burndy die 39 is formed from a block which includes a concavely curved die cavity 40 (FIG. 6) for crimping the workpiece. The rear surface 41 of the die 39 is convexly curved and is generally complementary to the concave die cavity 35 of the die 19. Accordingly, the die 39 is adapted to be received within the cavity 35 of the die 19 with the convex surface 41 of the die 39 seated against the concave surface defined by the die cavity 35 of the die 19.

Figure 6:
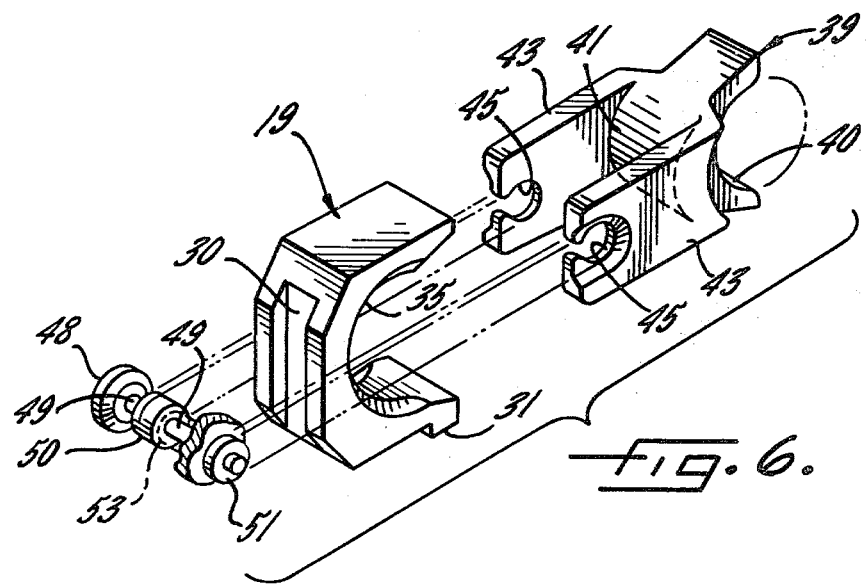
FIG. 6 is an exploded perspective view of the Kearney and Burndy dies and of part of the tool.

As shown in FIG. 6, two laterally spaced arms 43 are formed integrally with each Burndy die 39 and extend rearwardly from the convex surface 41 thereof. When the Burndy dies 39 are seated within the Kearney dies 19, the arms 43 straddle the Kearney dies. The arms of one Burndy die also straddle opposite sides of the leg 14 of the head 11 while the arms of the other Burndy die straddle the die holder 18. Rearwardly opening notches 45 (FIG. 6) are formed in the free ends of the arms 43 with each notch including a circular portion and also including an entrance portion whose height is less than the diameter of the circular portion.

Figure 5:
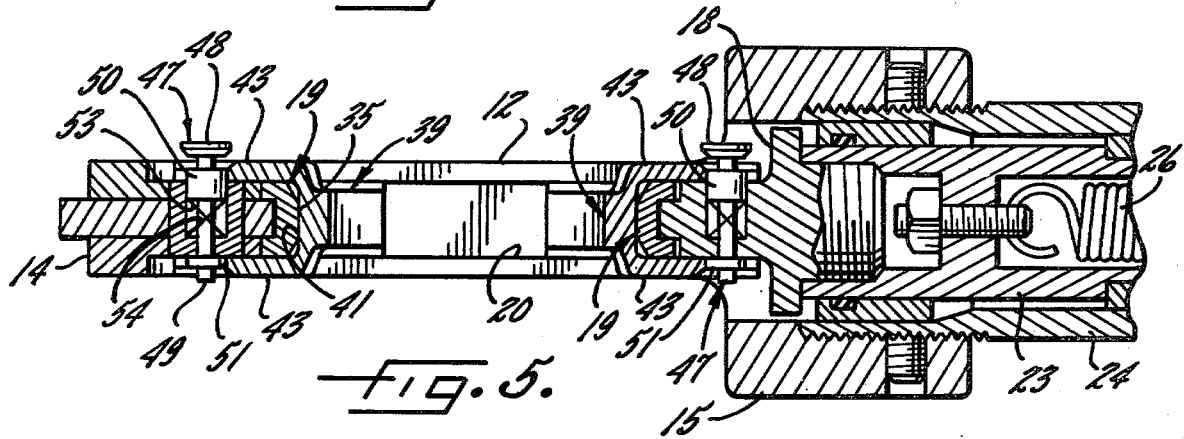
FIG. 5 is a fragmentary cross-section taken substantially along the line 5—5 of FIG. 4.

Each Burndy die 39 is adapted to be secured releasably in place by a laterally shiftable locking pin 47 which is adapted to enter the notches 45. As shown in FIGS. 4 and 5, one locking pin extends laterally through the leg 14 of the head 11 while the other locking pin extends laterally through the die holder 18. Each locking pin includes a head 48 and further includes a shank 49 (FIG. 6) whose diameter is less than the height of the entrance portions of the notches 45. Each locking pin further includes two enlarged collars 50 and 51 which are spaced laterally from one another in accordance with the lateral spacing between the arms 43 of the Burndy die 39. The diameter of each collar is just slightly less than the diameter of the circular portion of the notch 45.

Coiled springs 53 (FIG. 5) are telescoped over the shanks 49 of the locking pins 47 and are telescoped into counterbored holes 54 formed in the leg 14 and in the die holder 18. The springs 53 are compressed between the bottoms of the holes 54 and the collars 50 of the pins 47 and urge the pins laterally to a locking position in which the collars 51 engage the leg 14 and the die holder 18.

To install the Burndy dies 39, the head 48 of each locking pin 47 is pushed to depress the pin against the action of the spring 53 and to shift the collars 50 and 51 laterally. Thereafter, the Burndy die is slipped into the cavity 35 of the Kearney die 19 with the arms 43 moving alongside the Kearney die and with the entrance portions of the notches 45 slipping over the shank 49 of the locking pin. After the Burndy die has been seated within the Kearney die, the pin 47 is released so as to enable the spring 53 to shift the pin laterally and cause the collars 50 and 51 to enter the circular portions of the notches 45. The collars thus lock against the arms 43 and hold the Burndy dies in place. Removal of the Burndy dies may be effected simply by depressing the pins and pulling the Burndy dies out of the Kearney dies.

From the foregoing, it will be apparent that the present invention brings to the art a new and improved crimping tool 10 which may be used with either of two types of dies 19 and 39. As a result, the tool may be sold to users who possess either type of dies and hence it is not necessary to make and sell different types of tools to accommodate the different dies. Manufacturing and inventory requirements thus are simplified.

I claim:

1. A tool for crimping a workpiece and comprising a head having a pair of opposing die holders, means for moving one of said die holders toward and away from the other of said die holders, each of said die holders having a pocket, a first die seated within each pocket, first means for securing each first die releasably to the respective die holder, each of said first dies having a concavely curved die cavity, a second die seated within the die cavity of each first die, each of said second dies having a concavely curved die cavity for crimping said workpiece and having a convex surface adapted to be received in the die cavity of the respective first die, a pair of laterally spaced arms extending from the convex surface of each second die and straddling the respective first die, notches opening out of the free ends of said arms, and second means comprising laterally shiftable pins supported by and extending laterally of said head and adapted to be received in said notches to secure said second dies releasably to said head, the die cavities of said first dies being adapted to crimp said workpiece in the absence of said second dies.

2. A tool as defined in claim 1 in which a socket is formed in each of said first dies, said first means comprising screws extending through said die holders and seated in said sockets to secure said first dies releasably to said die holders.

3. A tool for crimping a workpiece and comprising a head having a pair of opposing die holders, means for moving one of said die holders toward and away from the other of said die holders, each of said die holders having a pocket formed with a tongue and a groove, a first die seated within each pocket and formed with a groove for receiving the tongue of the pocket and with a tongue adapted to fit within the groove of the pocket, a socket formed in each of said first dies, screws extending through said die holders and seated in said sockets to secure said first dies releasably to said die holders, each of said first dies having a concavely curved die cavity, a second die seated within the die cavity of each first die, each of said second dies having a concavely curved die cavity for crimping said workpiece and having a convex surface adapted to be received in the die cavity of the respective first die, each of said second dies further having a pair of laterally spaced arms extending from said convex surface and straddling the respective first die, notches opening out of the free ends of said arms, and laterally shiftable pins supported by and extending laterally of said head and adapted to be received in said notches to secure said second dies releasably to said head, the die cavities of said first dies being adapted to crimp said workpiece in the absence of said second dies.

4. A tool for crimping a workpiece and comprising a head having a pair of opposing die holders, means for moving one of said die holders toward and away from the other of said die holders, each of said die holders having a pocket and each being formed with a tongue and a groove, a first die seated within each pocket, each of said first dies being formed with a groove for receiving the tongue of the respective die holder and being formed with a tongue adapted to fit in the groove of the respective die holder, a socket formed in each of said first dies, screws extending through said die holders and seated in said sockets to secure said first dies releasably to said die holders, each of said first dies having a concavely curved die cavity, a second die seated within the die cavity of each first die, each of said second dies having a concavely curved die cavity for crimping said workpiece, each of said second dies having a convex surface adapted to be received in the die cavity of the respective first die and further having a pair of laterally spaced arms extending from said convex surface and straddling the respective first die, notches opening out of the free ends of said arms, and laterally shiftable pins supported by and extending laterally of said head and adapted to be received in said notches to secure said second dies releasably to said head, the die cavities of said first dies being adapted to crimp said workpiece in the absence of said second dies.

\* \* \* \* \*